United States Patent [19]

Shiga et al.

[11] Patent Number: 4,485,035
[45] Date of Patent: Nov. 27, 1984

[54] PROCESS FOR PRODUCING HIGHLY STEREOREGULAR α-OLEFIN POLYMERS

[75] Inventors: Akinobu Shiga; Yoshiharu Fukui; Toshio Sasaki, all of Niihama; Masahisa Okawa, Hirakata; Hideaki Matsuura, Niihama, all of Japan

[73] Assignee: Sumitomo Chemical Company, Limited, Osaka, Japan

[21] Appl. No.: 180,305

[22] Filed: Aug. 22, 1980

[30] Foreign Application Priority Data

Aug. 22, 1979 [JP] Japan ................. 54-107471

[51] Int. Cl.$^3$ .............................................. C08F 4/64
[52] U.S. Cl. .................................. 502/115; 526/125; 526/128; 526/127; 526/139; 526/140; 526/142
[58] Field of Search .................................. 252/429 B

[56] References Cited

U.S. PATENT DOCUMENTS

| 4,076,924 | 2/1978 | Toyota et al. | |
| 4,085,276 | 4/1978 | Toyota et al. | |
| 4,143,223 | 3/1979 | Toyota et al. | |
| 4,159,256 | 6/1979 | Sakurai et al. | 252/429 B |
| 4,186,107 | 1/1980 | Wagner | 252/429 B |
| 4,223,117 | 9/1980 | Sano et al. | 252/429 B X |
| 4,235,984 | 11/1980 | Shiga et al. | 252/429 B X |
| 4,252,670 | 2/1981 | Caunt et al. | 252/429 B |

FOREIGN PATENT DOCUMENTS

| 2657375 | 6/1977 | Fed. Rep. of Germany. |
| 1286867 | 8/1972 | United Kingdom. |
| 1540323 | 2/1979 | United Kingdom. |
| 1550195 | 8/1979 | United Kingdom. |

*Primary Examiner*—Patrick Garvin
*Attorney, Agent, or Firm*—Stevens, Davis, Miller & Mosher

[57] ABSTRACT

A process for producing α-olefin polymers of a high stereoregularity which comprises homopolymerizing an α-olefin having 3 to 10 carbon atoms or copolymerizing said α-olefin with other olefins of the same group or with ethylene using a catalyst system comprising three components (A), (B) and (C):

(A) a solid catalyst produced by reaction among a solid product described below, a compound group (III) comprising at least one compound having an O—C=O linkage and at least one compound having at least one member selected from C—O—H, C—O—C, C—N, C≡N, N—O—C, P—O—C, P—N—C, C—S—H, C—S—C, S—O—C and P—S—C linkages, and a titanium compound having at least one titanium-halogen linkage, said solid product being prduced by reacting an organo-magnesium compound with at least one of the following halogen-containing compounds (I) and (II),

(I) a halogeno-silicon compound of the formula, $R_n SiX_{4-n}$ (in which R is a hydrocarbon group having 1 to 8 carbon atoms, X is a halogen atom and n is a number satisfying the equation, $0 \leq n < 4$), (II) a halogeno-aluminum compound of the formula, $R_l AlX_{3-l}$ (in which R is a hydrocarbon group having 1 to 8 carbon atoms, X is a halogen atom and l is a number satisfying the equation, $0 \leq l < 3$), (B) an activating agent of the formula, $R_m AlY_{3-m}$ (in which R is a hydrocarbon group having 1 to 8 carbon atoms, Y is a halogen or hydrogen atom, and when Y is a halogen atom, m is a number satisfying the equation, $2 < m \leq 3$, and when Y is a hydrogen atom, m is a number satisfying the equation, $2 \leq m \leq 3$), (C) at least one electron donor having at least one nitrogen, oxygen, phosphorus or sulfur atom.

26 Claims, 1 Drawing Figure

PROCESS FOR PRODUCING HIGHLY STEREOREGULAR α-OLEFIN POLYMERS

The present invention relates to a process for producing α-olefin polymers of high crystallinity. Generally, it is well known that crystalline olefin polymers are produced with the so-called Ziegler-Natta catalyst comprising a compound of a transition metal in Groups IV to VI of the periodic table and a metal in Groups I to III of the same table or an organo-compound thereof. In the industrial production of olefin polymers from olefins such as propylene, butene-1 and the like, titanium trichloride compositions, or titanium tetrachloride or titanium trichloride deposited on a magnesium-containing halide carrier are used as catalyst. In this process, the polymers are commonly obtained as a slurry, and their bulk density, average particle size and particle size distribution affect production capacity so largely that these are important factors in terms of improvement in the efficiency of the reactor.

In general, polymerization processes with a catalyst on carrier have the drawbacks that the resulting polymers are small in bulk density and average particle size and are broad in particle size distribution. This process produces amorphous polymers as byproduct in addition to highly stereoregular olefin polymers of high industrial value. The amorphous polymers have little industrial value and exert a large adverse effect on the mechanical properties of the processed products of the olefin polymers such as film, fiber and the like. Further, formation of the amorphous polymers uselessly consumes a monomer as raw material, and at the same time equipment for removal of the polymers become necessary. This is a serious disadvantage from the industrial point of view. Consequently, if the formation of such amorphous polymers is completely, or, if any, substantially inhibited, this becomes a great advantage.

On the other hand, catalyst residues remain in the olefin polymers produced by this process, adversely affecting the stability and processability of the polymers. Accordingly, equipment for removal of the catalyst residues and stabilization of the polymers become necessary. These drawbacks of the process can be improved by increasing a catalytic activity which is expressed in the yield of olefin polymer per unit weight of catalyst. Further, equipment for removal of the catalyst residues become unnecessary, which makes it possible to reduce the manufacturing cost of the olefin polymer.

Many methods for producing supported catalysts for the polymerization of α-olefins (e.g. propylene), for example, the methods comprising co-pulverizing magnesium chloride, an inactive solid organic substance and a titanium tetrachloride-ester complex [Japanese Patent Publication (unexamined) No. 86482/1974], co-pulverizing magnesium chloride, a silicone compound and an ester, and reacting the co-pulverized product with titanium tetrachloride (Japanese Patent Publication No. 36786/1977) and by co-pulverizing magnesium chloride, an organic ester and an alcohol or phenol, and reacting the co-pulverized product with titanium tetrachloride [Japanese Patent Application Kokai (Laid-open) No. 104593/1977] have been proposed. In these methods, pulverization is essential to the production of the catalysts, and without pulverization, the resulting catalysts are extremely poor in activity. On the other hand, because of the pulverization, the catalysts become too fine so easily that they give a polymer having a large proportion of fine powder and a very broad particle size distribution. Such polymer is also very low in bulk density. Further, the above catalysts are poor in polymerization activity and stereoregularity, so that they are too unsatisfactory for use in the industrial stereoregular polymerization of α-olefins.

There is also a method including no pulverization. For example, Japanese Patent Application Kokai (Laid-open) Nos. 28189/1976 and 92885/1976 disclose a method which comprises treating magnesium chloride with an alcohol, an ester and a halogeno-aluminum, halogeno-silicon or halogeno-tin compound and then depositing titanium tetrachloride on the treated product. Like the foregoing catalysts produced by pulverization, a catalyst obtained by this method also gives a polymer having a large proportion of fine powder, and besides it is unsatisfactory in activity, and stereoregularity of produced polymer.

Previously, the present inventors produced a solid catalyst by reacting an organo-magnesium compound with a halogeno-silicon compound and/or halogeno-aluminum compound, treating the resulting solid product with an electron donor and depositing titanium tetrachloride on the resulting solid carrier, and found that this solid catalyst shows a high activity in the polymerization of α-olefins and gives a polymer having a high stereoregularity, high bulk density, large particle size and narrow particle size distribution [Japanese Patent Application Kokai (Laid-open) Nos. 112,983/1979 and 119,586/1979].

As a result of study to improve the above method, it was found that a solid catalyst, produced by reacting an organo-magnesium compound with a halogeno-silicon compound and/or halogeno-aluminum compound, and reacting the resulting solid product with at least two specified compounds and a titanium compound having at least one titanium-halogen bond, and a titanium compound having a titanium-halogen bond in various manners, thereby depositing the titanium compound on the solid product, shows a higher catalytic activity than the foregoing one and can give α-olefin polymers having an excellent stereoregularity, high bulk density, relatively large particle size and narrow particle size distribution. The present invention was thus achieved.

An object of the present invention is to provide a process for producing highly stereoregular α-olefin polymers having high bulk density, relatively large particle size and narrow particle size distribution.

Other object and advantages of the present invention will become apparent by the following explanation.

According to the present invention, there is provided a process for producing α-olefin polymers of a high stereoregularity characterized in that an α-olefin having 3 to 10 carbon atoms is homopolymerized or copolymerized with other olefins of the same group or with ethylene using a catalyst system comprising three components (A), (B) and (C):

(A) a solid catalyst prepared by a process comprising reacting an organo-magnesium compound with at least one of the following halogen compounds (I) and (II), (I) a halogeno-silicon compound of the formula, $R_nSiX_{4-n}$ (in which R is a hydrocarbon group having 1 to 8 carbon atoms, X is a halogen atom and n is a number satisfying the equation, $0 \leq n < 4$), (II) a halogeno-aluminum compound of the formula, $R_lAlX_{3-l}$ (in which R is a hydrocarbon group having 1 to 8 carbon atoms, X is a halogen atom and l is a number satisfying the equation, $0 \leq n < 3$), and reacting the resulting solid product with a compound group (III) comprising at least one compound having an O—C=O linkage and at least one compound having at least one member selected from C—O—H, C—O—C, C—N, C≡N, N—O—C, P—O—C, P—N—C, C—S—H, C—S—C, S—O—C and P—S—C linkages, and a titanium compound having at least one titanium-halogen linkage, (B) an activating agent of the formula, $R_mAlY_{3-m}$ (in which R is a hydrocarbon group having 1 to 8 carbon atoms, Y is a halogen or hydrogen atom, and when Y is a halogen atom, m is a number satisfying the equation, $2 < m \leq 3$, and when Y is a hydrogen atom, m is a number satisfying the equation, $2 \leq m < 3$), (C) at least one electron donor having at least one nitrogen, oxygen, phosphorus or sulfur atom.

One of the features of the present invention is that, by reaction among the solid product substantially different from magnesium chloride in chemical composition and crystal structure (produced by reacting an organo-magnesium compound with a halogeno-silicon compound and/or halogeno-aluminum compound), the foregoing at least two compounds (III) and the titanium compound having a titanium-halogen bond, the resulting catalyst is superior in catalytic activity and stereoregular effect to supported catalysts produced with the well-known magnesium chloride-containing carrier, and that, by using this catalyst, α-olefin polymers of a spherical and large-sized particle and a narrow particle size distribution which could be obtained with difficulty by the conventional methods, can be obtained.

It is a surprising fact that, by using at least two specified compounds (III) described above, a solid catalyst can be obtained which is so superior in activity and stereoregular effect as to be never expectable from the treatment of the well-known magnesium chloride carrier with electron donors.

The reason why the solid catalyst of the present invention has such the superior performances is not clarified at present, but it may be supposed that the catalytic activity and stereoregular effect are synergistically elevated by a combined effect developed at the stage wherein the compound group (III), the titanium compound having a titanium-halogen linkage and the solid product produced by reacting an organo-magnesium compound with a halogeno-silicon compound and/or halogeno-aluminum compound, are brought into reaction with one another. This effect is clearly observable in that the solid catalyst decreases in dimension and increases in specific surface area and rate at which titanium which is effective for polymerization is deposited on the carrier.

The organo-magnesium compound used for reaction with a halogeno-silicon compound and/or halogeno-aluminum compound may be any type of compound produced by the well-known reaction between an organo-halogen compound and metallic magnesium. Generally, however, Grignard compounds of the formula, RMgX (in which R is a hydrocarbon group having 1 to 8 carbon atoms and X is a halogen atom) and dialkyl magnesium compounds of the formula, RR'Mg (in which R and R' are each a hydrocarbon group having 1 to 8 carbon atoms) are preferably used.

Specific examples of the Grignard compound include for example ethylmagnesium chloride, n-propylmagnesium chloride, n-butylmagnesium chloride, isoamylmagnesium chloride, allylmagnesium chloride, phenylmagnesium chloride, n-butylmagnesium bromide and ethylmagnesium iodide. Of these compounds, organomagnesium chlorides synthesized from organic chlorides, for example n-propylmagnesium chloride and n-butylmagnesium chloride, are particularly preferred.

Specific examples of the dialkylmagnesium compound include for example diethylmagnesium, di-n-propylmagnesium, di-n-butylmagnesium, di-n-hexylmagnesium, n-butylethylmagnesium and diphenylmagnesium.

These organo-magnesium compounds are synthesized as a homogeneous solution or a suspension in a solvent. The solvent includes for example ether solvents (e.g. diethyl ether, di-n-propyl ether, di-n-butyl ether, diisoamyl ether, tetrahydrofuran), hydrocarbon solvents (e.g. hexane, heptane, octane, cyclohexane, benzene, toluene, xylene) or mixtures thereof.

The halogeno-silicon compound used for reaction with the organomagnesium compound is represented by the formula, $R_nSiX_{4-n}$ (in which R is a hydrocarbon group having 1 to 8 carbon atoms, X is a halogen atom and n is a number satisfying the equation, $0 \leq n < 4$ preferably $0 \leq n < 1$). A larger number of chlorine atoms is desirable. Specific examples of the halogeno-silicon compound include for example silicon tetrachloride, silicon tetrabromide, methylsilyl trichloride, dimethylsilyl dichloride, trimethylsilyl chloride, ethylsilyl trichloride, n-propylsilyl trichloride, n-butylsilyl trichloride, methylsilyl tribromide, vinylsilyl trichloride and phenylsilyl trichloride. Of these compounds, silicon tetrachloride is particularly preferred.

The halogeno-aluminum compound used for reaction with the organo-magnesium compound is represented by the formula, $R_lAlX_{3-l}$ (in which R is a hydrocarbon group having 1 to 8 carbon atoms, X is a halogen atom and l is a number satisfying the equation, $0 \leq l < 3$ preferably $0 \leq l \leq 2$). Specific examples of the halogeno-aluminum compound include for example anhydrous aluminum chloride, anhydrous aluminum bromide, ethylaluminum dichloride, n-propylaluminum dibromide, diethylaluminum chloride, di-n-propylaluminum chloride, methylaluminum sesquichloride and ethylaluminum sesquichloride. Of these compounds, anhydrous aluminum chloride, ethylaluminum dichloride, diethylaluminum chloride and ethylaluminum sesquichloride are particularly preferred.

The reaction of the organo-magnesium compound with the halogeno-silicon and/or halogeno-aluminum compound is carried out generally at −50° to 150° C., preferably 0° to 100° C.

The solvent used for this reaction includes for example aliphatic hydrocarbons (e.g. n-pentane, n-hexane, n-heptane, n-octane, n-decane), aromatic hydrocarbons (e.g. benzene, toluene, xylene), alicyclic hydrocarbons (e.g. cyclohexane, methylcyclohexane), aliphatic or cyclic ethers having 4 to 10 carbon atoms (e.g. diethyl ether, di-n-propyl ether, diisopropyl ether, di-n-butyl ether, diisoamyl ether, tetrahydrofuran, dioxane) and mixtures of the above hydrocarbons and ethers.

Preferably, this reaction is carried out by adding dropwise the halogen-containing compound or a solution of the compound in the above solvent to a solution of the organo-magnesium compound or adding in a reverse way. The reaction time is generally 10 minutes or more, preferably 0.5 to 5 hours. The molar ratio of the organo-magnesium compound to the halogen-containing compound is 1:10 to 10:1, preferably 1:2 to 2:1. The solid product thus obtained is separated from the reaction mixture, for example, by allowing the mixture to stand still and removing the supernatant liquor, and then thoroughly washed with a purified inert hydrocarbon solvent (e.g. pentane, hexane, heptane, octane, benzene, xylene, cyclohexane, methylcyclohexane, decalin). The solid product is then used, after being dried or as it is, for reaction with the compound group (III) and the titanium compound having a titanium-halogen bond.

This solid product contains about 0.1 to several percent by weight of silicon and/or aluminum atoms, and when the ether solvent is used, the solid product contains about 10 to about 60% by weight of the ether. This product shows an X-ray diffraction pattern completely different from that of magnesium chloride.

The compound group (III) used in the present invention comprises at least one compound having O—C=O linkage and at least one compound having at least one member selected from C—O—H, C—O—C, C—N, C≡N, N—O—C, P—O—C, P—N—C, C—S—H, C—S—C, S—O—C and P—S—C linkages.

As the compound having an O—C=O linkage, carboxylic acids, carboxylic acid esters, carboxylic anhydrides and carbonic acid esters are preferred. Specifically, there may be given for example acetic acid, isobutyric acid, stearic acid, salicylic acid, acrylic acid, methacrylic acid, benzoic acid, p-toluylic acid, p-anisic acid, p-hydroxybenzoic acid, phthalic acid, terephthalic acid, ethyl isobutyrate, ethyl salicylate, methyl methacrylate, methyl benzoate, ethyl benzoate, methyl p-toluylate, ethyl p-anisate, ethyl p-hydroxybenzoate, diethyl phthalate, dimethyl terephthalate, ε-caprolactone, acetic anhydride, benzoic anhydride and phthalic anhydride.

As the compound having a C—O—H linkage, alcohols, glycols, phenol and their derivatives are mentioned. Specifically, the may be mentioned for example methyl alcohol, ethyl alcohol, n-propyl alcohol, isopropyl alcohol, n-butyl alcohol, isobutyl alcohol, tert-butyl alcohol, n-hexyl alcohol, 2-ethylhexanol, cyclohexyl alcohol, benzyl alcohol, allyl alcohol, ethylene glycol, phenol, p-cresol, p-ethylphenol, hydroquinone, resorcinol, α-naphthol, and β-naphthol.

As the compound having a C—O—C linkage, ethers are preferred. Specifically, there may be mentioned for example diethyl ether, di-n-butyl ether, di-isoamyl ether, tetrahydrofuran, dioxane, anisole, furan, ethylene glycol diethyl ether and acetal.

As the compound having a C—N linkage, amines, amides, imines and imides are preferred. Specifically, there may be mentioned for example diisopropylamine, aniline, triethylamine, dimethylaniline, pyridne, pyrrole, acetamide, benzamide, N,N-dimethylamide, 4-butanelactam, ε-caprolactam, urea, tetramethylurea, p-aminophenol, p-dimethylaminophenol, pyrrolidine, piperidine, succinimide and phthalimide.

As the compound having a C≡N linkage, nitriles are preferred. Specifically, acetonitrile, benzonitrile and the like are mentioned.

As the compound having an N—O—C linkage, esters of nitrous acid are preferred. Specifically, n-butyl nitrate, phenyl nitrite and the like are mentioned.

As the compound having a P—O—C linkage, esters of phosphoric acid and phosphorous acid are preferred. Specifically, there may be mentioned for example triethyl phosphate, triphenyl phosphate, diphenyl phosphate, cresyldiphenyl phosphate, tri-n-butyl phosphite, triphenyl phosphite, diphenyl phosphite and hexamethyl phosphoric triamide.

As the compound having a C—S—H linkage, thiols and thiophenols are preferred. Specifically, ethane thiol, thiophenol, p-thiocresol and the like are mentioned.

As the compound having a C—S—C linkage, sulfides are preferred. Specifically, diethyl sulfide, methyl ethyl sulfide, di-n-butyl sulfide, thiophene and the like are mentioned.

As the compound having a S—O—C linkage, esters of sulfonic acid and sulforous acid are preferred. Specifically, diethyl sulfite, diphenyl sulfite, methyl ethanesulfonate, ethyl benzenesulfonate and the like are mentioned.

As the compound having a P—S—C linkage, thiophosphites are preferred. Specifically, triphenyl thiophosphite, trilauryl thiophosphite and the like are mentioned.

More preferably, the compound group (III) comprises at least one compound having an linkage and at least one compound having at least one member selected from $C(sp_2)$—O—H, $C(sp_2)$—O—C, P—O—$C(sp_2)$, $C(sp_2)$—S—H, $C(sp_2)$—S—C, P—S—$C(sp_2)$, N—O—$C(sp_2)$ and N—S—$C(sp_2)$ linkages in which $C(sp_2)$ means a carbon atom of which the valence electron system is a $sp_2$ hybridization and C means a carbon atom having an optional valence electron system.

Furthermore, preferably, the compound group (III) comprises at least one aromatic carboxylic ester and at least one aromatic compound represented by the formula, Ar—Q—R (in which Ar is an aryl group having 6 to 18 carbon atoms, Q is an oxygen or sulfur atom and R is a hydrogen atom or an alkyl group having 1 to 10 carbon atoms), or $(Ar-Q)_kP(Q-R)_{3-k}$ or (in which Ar is an aryl group having 6 to 18 carbon atoms, Q is an oxygen or sulfur atom, R is a hydrogen atom or an alkyl group having 1 to 10 carbon atoms, Z is a hydrogen atom or a Q—R group, and k is a number satisfying the equation, $1 \leq k \leq 3$).

Particularly preferred specific compounds include for example phenol, cresol, ethylphenol, naphthol, aminophenol, anisole, triphenyl phosphate, diphenyl phosphite, triphenyl phosphite, phenyl ethanesulfonate and triphenyl thiophosphite. Of these compounds, the aromatic phosphorus esters are particularly preferred.

The amount of the compound group (III) used is $10^{-5}$ to 0.1 mole each, preferably $10^{-4}$ to 0.02 mole each, of the component compounds based on 1 gram of the solid product.

The titanium compound having at least one titanium-halogen bond used in the present invention is preferably a compound of the formula, $TiX_jY_{4-j}$ (in which X is a halogen atom, Y is a halogen atom different from X or an alkoxy group having 1 to 8 carbon atoms and j is a number satisfying $1 \leq j \leq 4$). Specifically, there may be mentioned for example $TiCl_4$, $TiCl_3Br$, $TiBr_4$, $TiI_4$, $TiCl_3(OCH_3)$ and $TiCl_2(OC_2H_5)_2$. Of these compounds halogenated titanium compounds, particularly $TiCl_4$, are preferred.

The amount of the titanium compound used is $10^{-5}$ to 10 moles, preferably $10^{-4}$ to 1 mole based on 1 gram of the solid product.

In order to bring the solid product (hereinafter represented by the symbol D), the compound group (III) (hereinafter represented by the symbols $E_1$, $E_2$, $E_3$, - - - ) and the titanium compound (hereinafter represented by the symbol F) into reaction with one another, any of the well-known methods capable of bringing D, $E_1$, $E_2$, - - - and F into contact with one another, for example a slurry method in which the reaction is carried out in a slurry state, and mechanical pulverization using ball mills or the like, may be applied. But the slurry method is desirable in terms of particle size, particle size distribution and stereoregularity.

As to in what order the three components are brought into reaction with one another, the following orders may for example be taken:

(1) Reaction between D and ($E_1$, $E_2$, $E_3$, - - - ), followed by reaction with F, (2) simultaneous reaction of the three components and (3) reaction between D and $E_1$, followed by reaction with $E_2$ and F.

In the slurry method, the slurry concentration is not particularly limited, but it is generally 10 to 500 g/l, particularly preferably 50 to 300 g/l. Consequently, when D is first reacted with $E_1$ and/or $E_2$, it is desirable to carry out the reaction in the presence of a diluent. The diluent includes for example aliphatic hydrocarbons (e.g. pentane, hexane, heptane, octane), aromatic hydrocarbons (e.g. benzene, toluene, xylene) and alicyclic hydrocarbons (e.g. cyclohexane, cyclopentane).

The reaction temperature is not particularly limited, but preferably it is 0° to 150° C. The reaction time is 10 minutes or more, preferably 30 minutes to 10 hours. After completion of the reaction, it is desirable to treat the resulting product as follows: It is separated from the reaction mixture, for example by allowing the mixture to stand still and removing the supernatant liquor, and then after it is optionally washed with an inert hydrocarbon solvent and optionally dried, it is reacted with F.

In the slurry method, reaction with F is carried out without solvent or in an inert solvent (e.g. aliphatic hydrocarbons, aromatic hydrocarbons, alicyclic hydrocarbons). This reaction is preferably carried out at 0° to 150° C., and the reaction time is 10 minutes or more, preferably 30 minutes to 10 hours. After the reaction, the resulting solid catalyst is separated from the reaction mixture by allowing the mixture to stand still and removing the supernatant liquor, followed by washing with an inert hydrocarbon solvent.

$E_1$, $E_2$, $E_3$, - - - , and F may be used for reaction in two steps or more. In this case, it is desirable that reaction conditions for each step, for example, use or no use of solvent, amount of solvent used, amounts of $E_1$, $E_2$, - - - and F, slurry concentration, reaction temperature and reaction time, are within the ranges described hereinbefore. The separation, washing and drying of the solid product at each step are optional. After the final reaction, washing with an inert hydrocarbon solvent is carried out to obtain the objective solid catalyst.

For bringing D, $E_1$, $E_2$, - - - and F into reaction with one another using various mills, these compounds are placed in a suitable mill and pulverized at $-30°$ to 100° C. for 3 hours or more. Also, in this case, the reaction may be carried out in the different orders described above. After the reaction, the resulting solid may be used as solid catalyst as it is or after being washed with an inert hydrocarbon solvent.

In preparing the solid catalyst by the different methods, free F not deposited on D, or products resulting from the reaction between F and $E_1$ and/or $E_2$, are titanium components which are not effective for the polymerization of α-olefins. It is therefore desirable to carry out washing under such conditions that these components can be removed.

The content of titanium atom in the solid catalyst thus obtained is 0.1 to 20% by weight, preferably 0.3 to 10% by weight. This content of titanium atom depends largely upon the condition in which D, $E_1$, $E_2$, - - - and F are brought into reaction with one another. Consequently, the condition should be determined so that the above titanium content can be obtained.

The content of each of $E_1$, $E_2$, - - - in the solid catalyst thus obtained is 0.1 to 20% by weight, and the specific surface area of the catalyst is 200 m²/g or more.

Next, as specific examples of the activating agent of the formula, $R_mAlY_{3-m}$ (in which R is a hydrocarbon group having 1 to 8 carbon atoms, Y is a halogen or hydrogen atom, and when Y is a halogen atom, m is a number satisfying $2 < m \leq 3$, and when Y is a hydrogen atom, m is a number satisfying $2 \leq m \leq 3$), which is a component (B) of the present catalyst used for 60-olefin polymerization, trialkylaluminum, mixtures of trialkylaluminum and dialkylaluminum halide, and dialkylaluminum hydride are preferred. Particularly, triethylaluminum and mixtures of triethylaluminum and diethylaluminum chloride are preferably used.

The molar ratio of the titanium atom to the activating agent in the solid catalyst used for α-olefin polymerization may be selected from a range of 10:1 to 1:500. Particularly, a range of 2:1 to 1:200 is preferably used.

When α-olefin polymerization is carried out in the presence of an electron donor (a compound containing nitrogen, oxygen, phosphorus or sulfur atom) as a third component of the present catalyst system, polymers of an extremely high stereoregularity can be obtained.

Specific examples of the electron donor include for example amines, amides, ethers, esters, ketones, nitriles, phosphines, phosphites and sulfides. Of these compounds, esters particularly those of aromatic monocarboxylic acid, for example methyl benzoate, ethyl benzoate, methyl p-toluylate and ethyl p-anisate, are preferred.

The molar ratio of the titanium atom to the electron donor in the solid catalyst is within a range of 10:1 to 1:500, preferably 2:1 to 1:200.

The electron donor may be mixed with the activating agent before use. A preferred combination of the compound and the agent is that of triethylaluminum and said ester and that of triethylaluminum, diethylaluminum chloride and said ester.

Polymerization may be carried out over a wide range of −30° to 200° C. But, a range of 0° C. to 100° C. is generally preferred.

The polymerization pressure is not particularly limited, but pressure of about 3 to about 100 atm. is preferred in terms of the industrial and economical points of view.

Polymerization may be carried out by either of a continuous process or a batchwise one. Further, it may be carried out by any of the slurry polymerization technique using an inert hydrocarbon solvent (e.g. propane, butane, pentane, hexane, heptane, octane), the liquid-phase polymerization technique in liquid α-olefins and the gas-phase polymerization technique.

α-Olefins used in the present invention are those having 3 to 10 carbon atoms. Specific examples of α-olefin include for example propylene, butene-1, pentene-1, hexene-1, 3-methyl-pentene-1 and 4-methyl-pentene-1. But the present invention is not limited to these compounds. The present method can be applied not only to homopolymerization but also to copolymerization (including copolymerization with ethylene). In the copolymerization, copolymers can be obtained by using two or more of the α-olefins.

Also, the method of the present invention can easily be applied to hetero-block copolymerization in which polymerization is carried out in two steps or more.

The present invention will be illustrated with reference to the following examples, but is not limited thereto.

EXAMPLE 1

(A) Synthesis of organo-magnesium compound

Magnesium chip (16.1 g) for the preparation of Grignard reagent was placed in a 500-ml flask equipped with a stirrer, reflux condenser, dropping funnel and thermometer, and moisture on the inside surface of the flask and the surface of magnesium was completely expelled from the flask by passing argon gas therethrough at 120° C. for 2 hours.

Thereafter, n-butyl chloride (71 ml) and diethyl ether (275 ml) were placed in the dropping funnel, and the mixture was added dropwise to magnesium in the flask to start reaction. After adding the mixture with stirring over 1 hour under reflux of diethyl ether, reaction was continued for a further 3 hours at the same temperature to obtain a solution of n-butylmagnesium chloride in diethyl ether. The concentration of the chloride in this solution was 2.0 mole/l.

(B) Reaction between organo-magnesium compound and halogeno-aluminum compound.

The atmosphere in a 1-liter flask equipped with a stirrer, dropping funnel and thermometer was replaced by argon, and then the solution (250 ml) of n-butylmagnesium chloride in diethyl ether synthesized in (A) was added to the flask. Thereafter, a solution comprising n-heptane (200 ml) and diethylaluminum chloride (63 ml) was gradually added dropwise from the dropping funnel to form white precipitates while the temperature of the reaction mixture was kept at 30° C. The reaction was continued for a further 3 hours at 35° C., and the reaction mixture was separated into solid and liquid. The solid portion was washed with four 150 ml portions of n-hexane and dried under reduced pressure to obtain 61 g of a solid product.

(C) Reaction among solid product, compound group (III) and compound containing a titanium-halogen linkage The atmosphere in a 500-ml flask equipped with a stirrer and thermometer was replaced by argon, and then the solid product (30 g) synthesized in (B) was added to the flask and slurried with n-heptane (300 ml). Thereafter, ethyl benzoate (22.5 g, $5 \times 10^{-3}$ mole per gram of the solid product) was gradually added with stirring, and reaction was then continued for 1.5 hours at 35° C. After the reaction was finished, the reaction mixture was separated into solid and liquid, and the solid portion was washed with four 100 ml portions of n-heptane and dried under reduced pressure to obtain 29 g of a solid (first reaction).

The solid (20 g) obtained by the first reaction was added to a 300-ml flask equipped with a stirrer and thermometer and slurried with n-heptane (200 ml). Diphenyl phosphite (28.1 g, $6 \times 10^{-3}$ mole per gram of the solid) was then gradually added with stirring, and reaction was continued at 50° C. for 1 hour. After the reaction was finished, the reaction mixture was separated into solid and liquid, and the solid portion was washed with four 100 ml portions of n-heptane and dried under reduced pressure to obtain 19 g of a solid (second reaction).

The solid (10 g) obtained by the second reaction was added to a 100-ml flask equipped with a stirrer and thermometer and slurried with titanium tetrachloride (70 ml), and reaction was then continued at 120° C. for 2 hours with stirring (third reaction). After the reaction was finished, the reaction mixture was separated at 100° C. into solid and liquid, and the solid portion was washed with five 50 ml portions of n-heptane and dried under reduced pressure to obtain 8 g of a solid catalyst. This solid catalyst contained 2.9% by weight of titanium atom and had a specific surface area of 220 $m^2/g$.

(D) Propylene polymerization I

The atmosphere in a 5-liter stainless steel autoclave was replaced with argon, and a n-heptane solution (5 ml) containing triethylaluminum (1.0 g) and ethyl p-anisate (0.63 g) and the solid catalyst (70 mg) obtained in (C) were added to the autoclave. After adding hydrogen corresponding to a partial pressure of 0.5 atm., liquid propylene (1.4 kg) was charged therein under pressure. The autoclave was kept at 60° C. for 2 hours with stirring.

After the polymerization was finished, an excess of propylene was purged, and the resulting polymer was dried to obtain 459 g of white powdery polypropylene. The polymerization activity per 1 gram of titanium and 1 hour (hereinafter represented by $<R>$) was 113 kg/gTi.hr, and the boiling heptane-insoluble portion (hereinafter represented by $<I.I.>$) was 94.9%.

(E) Propylene polymerization II

A procedure was carried out in the same manner as in (D) except that the amount of triethylaluminum was changed to 0.5 g, diethylaluminum chloride (0.53 g) was added, and that the amount of the solid catalyst was changed to 65 mg. Thus, 588 g of white powdery polypropylene was obtained. $<R>156$ kg/gTi.hr $<I.I.>94.8\%$

COMPARATIVE EXAMPLE 1

The atmosphere in a 5-liter stainless steel autoclave was replaced by argon, and a n-heptane solution (10 ml) containing diethylaluminum chloride (1.6 g) and the solid catalyst (130 mg) obtained in (C) were added. After adding hydrogen corresponding to a partial pressure of 0.5 atm., liquid propylene (1.4 kg) was charged therein under pressure. The autoclave was kept at 60° C. for 2 hours with stirring.

After the polymerization was finished, an excess of propylene was purged, and the resulting polymer was dried to obtain 52 g of polypropylene. <R>6.9 kg/gTi.hr. <I.I.>74.7%.

COMPARATIVE EXAMPLE 2

Propylene was polymerized in the same manner as in (D) of Example 1 except that ethyl p-anisate was not used, and that 50 mg of the solid catalyst obtained in (C) of Example 1 was used. The polymerization activity per gram of titanium was 140 kg/gTi.hr. <I.I.>78.1%.

EXAMPLES 12 TO 15

Polymerization was carried out in the same manner as in (D) of Example 1 using solid catalysts which were prepared in the same manner as in (C) of Example 1 except that:

(1) In the first reaction, the mole number of ethyl benzoate, and the reaction temperature and time were changed as shown in Table 2;

(2) in the second reaction, the mole number of diphenyl phosphite, and the reaction temperature and time were changed as shown in Table 2. The results are shown in Table 2.

TABLE 2

| Example | First reaction | | | Second reaction | | | <R> Kg/gTi · hr | <I.I.> % |
|---|---|---|---|---|---|---|---|---|
| | Mole number | Temperature (°C.) | Time (hr) | Mole number | Temperature (°C.) | Time (hr) | | |
| 12 | $7 \times 10^{-3}$ | 30 | 1 | $6 \times 10^{-3}$ | 50 | 1 | 101 | 95.2 |
| 13 | $2 \times 10^{-3}$ | 70 | 1 | $5 \times 10^{-3}$ | 70 | 1 | 120 | 94.3 |
| 14 | $1 \times 10^{-3}$ | 90 | 2 | $8 \times 10^{-3}$ | 30 | 2 | 131 | 94.0 |
| 15 | $5 \times 10^{-3}$ | 40 | 1 | $4 \times 10^{-3}$ | 90 | 1 | 138 | 93.7 |

EXAMPLES 2 TO 11 AND COMPARATIVE EXAMPLES 3 TO 5

Polymerization was carried out in the same manner as in (D) of Example 1 using solid catalysts which were prepared in the same manner as in (C) of Example 1 except that:

(1) In place of ethyl benzoate used in the first reaction in (C) of Example 1, various compounds of the compound group (III) shown in Table 1 were used, and their amount was shown in Table 1 in a mole number per gram of the solid product;

(2) in place of diphenyl phosphite used in the second reaction in (C) of Example 1, various compounds of the compound group (III) shown in Table 1 were used, and their amount was shown in Table 1 in a mole number per gram of the solid product; or (3) the first reaction and/or second reaction were omitted.

EXAMPLE 16

Polymerization was carried out in the same manner as in (D) of Example 1 using a solid catalyst which was prepared in the same manner as in (C) of Example 1 except that the third reaction was carried out using 50 ml of titanium tetrachloride, the reaction mixture was separated into solid and liquid, and the solid portion was allowed to react with titanium tetrachloride (50 ml) at 100° C. for 1 hour (the subsequent treatment was the same as in (C) of Example 1). <R>135 kg/gTi.hr. <I.I.>95.0%.

EXAMPLE 17

In the same manner as in (A) of Example 1, an n-butylmagnesium chloride solution was obtained using magnesium (16.1 g), n-butyl chloride (71 ml), tetrahydrofuran (163 ml) and toluene (150 ml) (reaction temperature 50° C.).

To this solution was added dropwise a mixture of silicon tetrachloride (75 ml) and toluene (75 ml) at 50°

TABLE 1

| | Synthetic conditions for solid catalyst | | | | | |
|---|---|---|---|---|---|---|
| | First reaction | | Second reaction | | <R> Kg/gTi · Hr | <I.I.> % |
| | Compound | Mole number per gram of the solid product | Compound | Mole number per gram of the solid product | | |
| Example | | | | | | |
| 1 | Ethyl benzoate | $5 \times 10^{-3}$ | Diphenyl phosphite | $6 \times 10^{-3}$ | 113 | 94.9 |
| 2 | " | " | Phenol | $5 \times 10^{-3}$ | 99 | 94.1 |
| 3 | " | " | p-Cresol | " | 96 | 94.0 |
| 4 | " | $6 \times 10^{-3}$ | p-Ethylphenol | $7 \times 10^{-3}$ | 100 | 94.2 |
| 5 | " | " | Triphenyl phosphite | $5 \times 10^{-3}$ | 118 | 95.0 |
| 6 | Methyl benzoate | $5 \times 10^{-3}$ | Diphenyl phosphite | " | 121 | 95.3 |
| 7 | " | " | Anisole | $1 \times 10^{-3}$ | 98 | 94.4 |
| 8 | " | " | p-Aminophenol | $5 \times 10^{-3}$ | 105 | 94.1 |
| 9 | " | " | n-Butyl nitrite | $3 \times 10^{-3}$ | 95 | 94.5 |
| 10 | Ethyl p-anisate | " | Triphenyl thiophosphite | $5 \times 10^{-3}$ | 113 | 94.2 |
| 11 | " | " | Hydroquinone | $3 \times 10^{-3}$ | 98 | 94.3 |
| Comparative Example | | | | | | |
| 3 | Ethyl benzoate | $5 \times 10^{-3}$ | None | — | 35 | 94.0 |
| 4 | None | — | Diphenyl phosphite | $6 \times 10^{-3}$ | 103 | 87.4 |
| 5 | None | — | None | — | 41 | 88.6 |

C. over 2 hours to form white precipitates. After continuing the reaction at 60° C. for a further 2 hours, the reaction mixture was separated into solid and liquid, and the solid portion was washed and dried to obtain 130 g of a solid product.

This solid product (10 g) was added to an 100-ml flask and slurried with titanium tetrachloride (70 ml). Thereafter, ethyl benzoate (2.5 g) and diphenyl phosphite (2.8 g) were further added, and reaction was carried out at 110° C. for 2 hours. The reaction mixture was separated into solid and liquid at 110° C., and the solid portion was washed with n-heptane and dried to obtain 7 g of a solid catalyst. Using this solid catalyst, polymerization was carried out in the same manner as in (D) of Example 1. <R>144 kg/gTi.hr.<I.I.>94.7%.

COMPARATIVE EXAMPLE 6

A solid catalyst was obtained in the same manner as in Example 17 except that ethyl benzoate was not used. Using this catalyst, polymerization was carried out in the same manner as in (D) of Example 1. <R>105 kg/gTi.hr.<I.I.>88.4%.

COMPARATIVE EXAMPLE 7

A solid catalyst was obtained in the same manner as in Example 17 except that diphenyl phosphite was not used. Using this catalyst, polymerization was carried out in the same manner as in (D) of Example 1. <R>42 kg/gTi.hr.<I.I.>94.1%.

EXAMPLE 18

Magnesium chip (16.1 g) for the preparation of Grignard reagent was placed in an 1-liter flask equipped with a stirrer, reflux condenser, dropping funnel and thermometer, and moisture on the inside surface of the flask and the surface of magnesium was completely expelled from the flask by passing argon gas therethrough at 120° C. for 2 hours.

Thereafter, n-butyl chloride (71 ml) and di-n-butyl ether (370 ml) were placed in the dropping funnel, and the mixture was added dropwise to magnesium in the flask to start reaction. After adding the mixture at 50° C. over 2 hours, reaction was continued at 70° C. for 3 hours to obtain a solution of n-butylmagnesium chloride in di-n-butyl ether. The concentration of the chloride in this solution was 1.4 mole/l.

To this solution (300 ml) was added dropwise silicon tetrachloride (50 ml) at 50° C. over 2 hours to form white precipitates. After continuing the reaction at 60° C. for a further 2 hours, the reaction mixture was separated into solid and liquid, and the solid portion was washed and dried to obtain 51 g of a solid product.

This solid product (10 g) was placed in an 100-ml flask and slurried with titanium tetrachloride (70 ml). Thereafter, ethyl benzoate (2.5 g) and triphenyl phosphite (3.7 g) were added, and reaction was carried out at 130° C. for 1.5 hours. The reaction mixture was separated into solid and liquid at 100° C., and the solid portion was washed and dried to obtain a solid catalyst. Using this catalyst, polymerization was carried out in the same manner as in (D) of Example 1. <R>115 kg/gTi.hr.<I.I.>95.4%.

Figure 1:
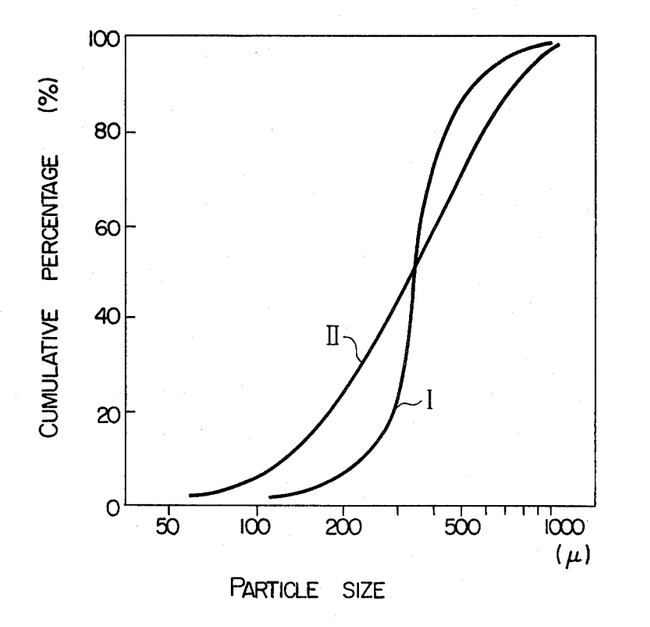
The accompanying drawing shows the particle size distribution of polypropylene obtained in Example 18 and Comparative example 8. The curve I shows the particle size distribution of polypropylene obtained in Example 18 and the curve II shows that of the other polypropylene.

The bulk density of this polypropylene was 0.41 g/ml, and the particle size distribution of this powder was narrow as shown in FIG. 1.

COMPARATIVE EXAMPLE 8

Polymerization was carried out in the same manner as in (D) of Example 1 using a solid catalyst which was prepared in the same manner as in Example 18 except that the mechanically pulverized product (10 g) of commercial anhydrous magnesium chloride was used in place of the solid product. <R>57 kg/gTi.hr.<I.I.>92.7%. The bulk density of this polypropylene powder was 0.30 g/ml, and the particle size distribution of this powder was broad as shown in FIG. 1.

EXAMPLE 19

The solid product (10 g) obtained in Example 18 was placed in an 100-ml flask and slurried with toluene (50 ml). Thereafter, ethyl benzoate (7.0 g) and diphenyl phosphite (13.5 g) were added with stirring, and reaction was continued at 50° C. for 1 hour. The resulting solid was washed, dried and slurried with toluene (20 ml) and titanium tetrachloride (60 ml), and reaction was carried out at 120° C. for 2 hours with stirring.

After the reaction was finished, the reaction mixture was separated into solid and liquid, and the solid portion was washed with five 50 ml portions of n-heptane and dried under reduced pressure to obtain 8 g of a solid catalyst. Using this solid catalyst, polymerization was carried out in the same manner as in (D) of Example 1. <R>112 kg/gTi.hr.<I.I.>95.1%.

EXAMPLE 20

The solid product (10 g) obtained in (B) of Example 1 was placed in an 100-ml flask and slurried with n-heptane (80 ml). Thereafter, p-ethylphenol (6.1 g) was added with stirring, and reaction was carried out at 50° C. for 1 hour. The resulting solid was washed, dried and slurried with titanium tetrachloride (70 ml). Ethyl benzoate (2.3 g) was then added thereto with stirring, and reaction was carried out at 130° C. for 1 hour.

After the reaction was finished, the reaction mixture was separated into solid and liquid, and the solid portion was washed and dried to obtain a solid catalyst. Using this solid catalyst, polymerization was carried out in the same manner as in (D) of Example 1. <R>102 kg/gTi.hr.<I.I.>94.1%.

EXAMPLE 21

Polymerization was carried out in the same manner as in (D) of Example 1 using a solid catalyst which was prepared in the same manner as in Example 20 except that methyl p-toluylate (3.0 g) was used in place of p-ethylphenol and that p-cresol (1.2 g) was used in place of ethyl benzoate. <R>94 kg/gTi.hr.<I.I.>94.3%.

EXAMPLE 22

The solid product (10 g) obtained in Example 17 was placed in an 100-ml flask and slurried with n-heptane (20 ml) and titanium tetrachloride (60 ml). Thereafter, ethyl benzoate (2.5 g) was added with stirring, and reaction was carried out at 100° C. for 1 hour. The resulting solid was washed, dried and slurried with titanium tetrachloride (60 ml). Diphenyl phosphite (2.8 g) was then added thereto with stirring, and reaction was carried out at 120° C. for 2 hours. After the reaction was finished, the reaction mixture was separated into solid and liquid at 100° C., and the solid portion was washed and dried to obtain a solid catalyst. Using this solid catalyst, polymerization was carried out in the same manner as in (D) of Example 1. $<R<141$ kg/gTi.hr.$<$I.I.$>94.9\%$.

EXAMPLE 23

Polymerization was carried out in the same manner as in (D) of Example 1 using a solid catalyst which was prepared in the same manner as in Example 22 except that triphenyl phosphite (3.7 g) was used in place of ethyl benzoate, and that ethyl benzoate (2.5 g) was used in place of diphenyl phosphite. $<R>132$ kg/gTi.hr.$<$I.I.$>94.5\%$.

EXAMPLE 24

Polymerization was carried out in the same manner as in (D) of Example 1 using a solid catalyst which was prepared in the same manner as in Example 22 except that ethyl benzoate (2.5 g) was added together with diphenyl phosphite. $<R>138$ kg/gTi.hr.$<$I.I.$>95.6\%$.

EXAMPLE 25

A solid catalyst was obtained in the same manner as in Example 17 except that a solution of di-n-hexylmagnesium in hexane (molar ratio of magnesium to silicon was 1) was used in place of the n-butylmagnesium chloride solution. Using this solid catalyst, polymerization was carried out in the same manner as in (D) of Example 1. $<R<103$ kg/gTi.hr.$<$I.I.$>94.4\%$.

What is claimed is:

1. A solid catalyst for the polymerization of an olefin produced by reaction among a solid product described below, a compound group (III) comprising at least one aromatic carboxylic monoester and at least one aromatic compound of the formula, Ar—O—R (in which Ar is an aryl group having 6 to 18 carbon atoms, Q is an oxygen or sulfur atom and R is a hydrogen atom or an alkyl group having 1 to 10 carbon atoms) or $(Ar—Q)_kP(Q—R)_{3-k}$ or (in which Ar is an aryl group having 6 to 18 carbon atoms, Q is an oxygen or sulfur atom, R is a hydrogen atom or an alkyl group having 1 to 10 carbon atoms, Z is a hydrogen atom or a Q—R group, and k is a number satisfying the equation, $1 \leq k \leq 3$); and a titanium compound having at least one titanium-halogen linkage, the amount of each of the compound constituting the compound group (III) being $10^{-5}$ to 0.1 mole per gram of the solid product, and the amount of the titanium compound being $10^{-5}$ to 10 moles per gram of the solid product, and, said reaction being carried out in a slurry state at 0° to 150° for 10 minutes or more, said solid product being produced by reacting an organomagnesium compound represented by the formulae, RMgX (in which R is a hydrocarbon group having 1 to 8 carbon atoms and X is a halogen atom) with at least one of the following halogen-containing compounds (I) and (II), (I) a halogen-silicon compound of the formula, $R_nSiX_{4-n}$ (in which R is a hydrocarbon group having 1 to 8 carbon atoms, X is a halogen atom and n is a number satisfying the equation, $0 \leq n < 4$), (II) a halogen-aluminum compound of the formula, $R_lAlX_{3-l}$ (in which R is a hydrocarbon group having 1 to 8 carbon atoms, X is a halogen atom and l is a number satisfying the equation, $0 \leq l < 3$), the molar ratio of the organo-magnesium compound to the halogen-containing compound being 1:10 to 10:1, at −50° to 150° C. for 10 minutes or more.

2. A catalyst according to claim 1, wherein said halogen-containing compound (I) is a halogenosilicon compound of the formula, $R_4SiX_{4-n}$ (in which R is a hydrocarbon group having 1 to 8 carbon atoms, X is a halogen atom and n is a number satisfying the equation, $0 \leq n \leq 1$).

3. A catalyst according to claim 2, wherein the halogen-containing compound (I) is silicon tetrachloride.

4. A catalyst according to claim 1, wherein said halogen-containing compound (II) is a halogenoaluminum compound of the formula, $R_lAlX_{3-l}$ (in which R is an ethyl group, X is a chlorine atom and l is a number satisfying the equation, $0 \leq l \leq 2$).

5. A catalyst according to claim 1, wherein said solid product is produced by reacting an organo-magnesium compound with at least one of the halogen-containing compounds (I) and (II) in a solvent comprising a hydrocarbon compound and/or an ether compound.

6. A catalyst according to claim 5, wherein the solvent is a mixture of a hydrocarbon compound and an ether compound.

7. A catalyst according to claim 6, wherein the amount of the ether compound is 0.1 to 10 times by mole based on the organo-magnesium compound.

8. A catalyst according to claim 5, wherein the ether compound is an aliphatic or cyclic ether having 4 to 10 carbon atoms.

9. A catalyst according to claim 1, wherein said molar ratio is 1:2 to 2:1.

10. A catalyst according to claim 1, wherein said reaction is carried out at 0° to 100° C.

11. A catalyst according to claim 1, wherein said compound having an O—C=O linkage is a carboxylic ester.

12. A catalyst according to claim 11, wherein the aromatic monocarboxylic ester is one member selected from methyl benzoate, ethyl benzoate, methyl p-toluylate and ethyl p-anisate.

13. A catalyst according to claim 1, wherein the compound group (III) comprises at least one aromatic carboxylic ester and at least one aromatic phosphorous ester.

14. A catalyst according to claim 13, wherein the aromatic phosphorous ester is one member selected from diphenyl phosphite and triphenyl phosphite.

15. A catalyst according to claim 1, wherein said amount is $10^{-4}$ to 0.02 mole per gram of the solid product.

16. A catalyst according to claim 1, wherein said titanium compound is represented by the formula, $TiX_jY_{4-j}$ (in which X is a halogen atom, Y is a halogen atom different from X or an alkoxy group having 1 to 8 carbon atoms, and j is a number satisfying the equation, $1 \leq j \leq 4$).

17. A catalyst according to claim 16, wherein Y is a halogen atom different from X.

18. A catalyst according to claim 16, wherein the titanium compound is titanium tetrachloride.

19. A catalyst according to claim 1, wherein said amount is $10^{-4}$ to 1 mole per gram of the solid product.

20. A catalyst according to claim 1, wherein the concentration of the slurry is 10 to 500 g/l.

21. A catalyst according to claim 20, wherein said concentration is 50 to 300 g/l.

22. A catalyst according to claim 1, wherein said period of time is 30 minutes to 10 hours.

23. A catalyst according to claim 1, wherein the content of titanium atom in the solid catalyst is 0.1 to 20% by weight.

24. A catalyst according to claim 23, wherein said content is 0.3 to 10% by weight.

25. A catalyst according to claim 1, wherein the amount of each of the compounds constituting the compound group (III) is 0.1 to 20% by weight.

26. A catalyst according to claim 1, wherein the specific surface area of the solid catalyst is 200 m$^2$/g or more.

* * * * *